(12) United States Patent
Fujii

(10) Patent No.: US 9,666,375 B2
(45) Date of Patent: *May 30, 2017

(54) VOLTAGE SMOOTHING CIRCUIT, VOLTAGE CONVERSION CIRCUIT, AND METHOD FOR CONTROLLING VOLTAGE TO BE APPLIED TO MULTILAYER CAPACITOR

(71) Applicant: Murata Manufacturing Co., Ltd., Nagaokakyo-shi, Kyoto-fu (JP)

(72) Inventor: Yasuo Fujii, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 98 days.

This patent is subject to a terminal disclaimer.

(21) Appl. No.: 14/701,756

(22) Filed: May 1, 2015

(65) Prior Publication Data

US 2015/0325376 A1    Nov. 12, 2015

(30) Foreign Application Priority Data

May 9, 2014 (JP) .................................. 2014-097518

(51) Int. Cl.
*H01G 4/38* (2006.01)
*H01G 4/30* (2006.01)
(Continued)

(52) U.S. Cl.
CPC ................. *H01G 4/38* (2013.01); *H01G 2/06* (2013.01); *H01G 4/248* (2013.01); *H01G 4/30* (2013.01);
(Continued)

(58) Field of Classification Search
CPC ........ H01G 4/012; H01G 4/232; H01G 4/248; H01G 4/30; H01G 4/385; H02M 1/15; H02M 3/07; H02M 5/42
See application file for complete search history.

(56) References Cited

U.S. PATENT DOCUMENTS

| 2010/0127787 | A1* | 5/2010 | Kurogo ..................... H03B 5/04 331/158 |
| 2015/0014036 | A1* | 1/2015 | Park ......................... H01G 4/30 174/260 |
| 2015/0200056 | A1* | 7/2015 | Koller ...................... H01G 4/30 323/304 |

FOREIGN PATENT DOCUMENTS

| JP | 2002-232110 A | 8/2002 |
| JP | 2013-258278 A | 12/2013 |

OTHER PUBLICATIONS

Official Communication issued in corresponding Japanese Patent Application No. 2014-097518, mailed on Oct. 4, 2016.

* cited by examiner

*Primary Examiner* — Adolf Berhane
*Assistant Examiner* — Bart Iliya
(74) *Attorney, Agent, or Firm* — Keating & Bennett, LLP

(57) ABSTRACT

A voltage smoothing circuit includes a first multilayer capacitor, a second multilayer capacitor, and a regulator including an input terminal electrically connected to the second multilayer capacitor and an output terminal electrically connected to the first multilayer capacitor. The regulator calculates a first voltage applied to the first multilayer capacitor based on a second voltage applied to the second multilayer capacitor from the input terminal such that a potential difference which is applied to the first multilayer capacitor decreases or increases when a potential difference which is applied to the second multilayer capacitor increases or decreases, and outputs the first voltage from the output terminal.

18 Claims, 9 Drawing Sheets

(51) Int. Cl.
*H01G 4/248* (2006.01)
*H02M 1/15* (2006.01)
*H02M 3/07* (2006.01)
*H02M 5/42* (2006.01)
*H01G 2/06* (2006.01)

(52) U.S. Cl.
CPC ............... *H02M 1/15* (2013.01); *H02M 3/07* (2013.01); *H02M 5/42* (2013.01)

| Vmon | VALUE OF Ro AS OFFSET RESISTOR | AMPLIFICATION FACTOR Rf/Rs |
|---|---|---|
| c 1 | r 1 | z 1 |
| c 2 | r 2 | z 2 |
| ⋮ | ⋮ | ⋮ |
| ⋮ | ⋮ | ⋮ |

VOLTAGE SMOOTHING CIRCUIT, VOLTAGE CONVERSION CIRCUIT, AND METHOD FOR CONTROLLING VOLTAGE TO BE APPLIED TO MULTILAYER CAPACITOR

BACKGROUND OF THE INVENTION

1. Field of the Invention

The present invention relates to a voltage smoothing circuit, a method for controlling a voltage to be applied to a multilayer capacitor that is included in the voltage smoothing circuit, and a voltage conversion circuit.

2. Description of the Related Art

Increase in capacitance of a multilayer ceramic capacitor has been advanced to thus enable a power supply voltage of an electronic apparatus to be used as a smoothing capacitor. Further, with recent advancement in size reduction of the electronic apparatus, usage of the multilayer ceramic capacitor having large capacitance and reduced in size has further increased. Ceramic materials used in the multilayer ceramic capacitor have piezoelectricity and an electrostrictive property. Accordingly, distortion is generated thereon when a voltage is applied. In particular, when an alternating current (AC) voltage or a direct-current (DC) voltage on which an AC component is superimposed is applied to the multilayer ceramic capacitor having large capacitance, vibration is generated due to the above-mentioned distortion in some cases. This results in vibration of a circuit board on which the multilayer ceramic capacitor is mounted and acoustic noise is generated in some cases.

Japanese Unexamined Patent Application Publication No. 2013-258278 discloses a method for driving a multilayer ceramic capacitor in which a first multilayer capacitor and a second multilayer capacitor are stacked. Japanese Unexamined Patent Application Publication No. 2013-258278 indicates that the above-mentioned acoustic noise is suppressed by driving the first multilayer capacitor and the second multilayer capacitor in opposite phases.

However, distortion on the first multilayer capacitor and distortion on the second multilayer capacitor cannot be completely cancelled by each other even by using the driving method as described in Japanese Unexamined Patent Application Publication No. 2013-258278. Accordingly, when a circuit is formed using the above-mentioned multilayer capacitor, distortion tends to be generated on an output voltage.

SUMMARY OF THE INVENTION

Accordingly, preferred embodiments of the present invention provide a voltage smoothing circuit including a multilayer capacitor and capable of providing a smooth voltage and reducing acoustic noise from a circuit board and a voltage conversion circuit including the voltage smoothing circuit.

Also, preferred embodiments of the present invention provide a method for controlling a voltage to be applied to the multilayer capacitor in the voltage smoothing circuit including the multilayer capacitor.

According to a preferred embodiment of the present invention, a voltage smoothing circuit for smoothing a voltage includes a first multilayer capacitor, a second multilayer capacitor connected to the first multilayer capacitor, and a regulator including an input terminal and an output terminal. The input terminal is electrically connected to the second multilayer capacitor, and the output terminal is electrically connected to the first multilayer capacitor. The regulator calculates a first voltage which is applied to the first multilayer capacitor based on a second voltage which is applied to the input terminal such that a potential difference which is applied to the first multilayer capacitor decreases when a potential difference which is applied to the second multilayer capacitor increases and the potential difference which is applied to the first multilayer capacitor increases when the potential difference which is applied to the second multilayer capacitor decreases, and outputs the first voltage from the output terminal.

In a specific aspect of the voltage smoothing circuit according to various preferred embodiments of the present invention, each of the first multilayer capacitor and the second multilayer capacitor includes an end portion at a high-voltage side and an end portion at a low-voltage side, the end portion of the second multilayer capacitor at the high-voltage side is electrically connected to the first multilayer capacitor, and the first voltage is higher than the second voltage.

In another specific aspect of the voltage smoothing circuit according to various preferred embodiments of the present invention, the regulator calculates the first voltage and an average value of voltages that are input in a predetermined period of time is set as the second voltage.

In still another specific aspect of the voltage smoothing circuit according to various preferred embodiments of the present invention, the regulator calculates the first voltage and a voltage that has been actually input is set as the second voltage.

In still another specific aspect of the voltage smoothing circuit according to various preferred embodiments of the present invention, each of the first multilayer capacitor and the second multilayer capacitor includes an end portion at a high-voltage side and an end portion at a low-voltage side, and the end portion of the first multilayer capacitor at the low-voltage side is electrically connected to the end portion of the second multilayer capacitor at the low-voltage side.

In still another specific aspect of the voltage smoothing circuit according to various preferred embodiments of the present invention, the regulator includes an inverting amplification circuit and the inverting amplification circuit outputs an output voltage with a phase inverted with respect to a phase of an input voltage.

In still another specific aspect of the voltage smoothing circuit according to various preferred embodiments of the present invention, a first memory storing a first correspondence table containing a correspondence relationship between the input voltage of the inverting amplification circuit defining and serving as the second voltage and an amplification factor or an offset resistance value is further provided, and the regulator controls a magnitude of the first voltage based on the first correspondence table.

In still another specific aspect of the voltage smoothing circuit according to various preferred embodiments of the present invention, a second memory storing a second correspondence table containing a correspondence relationship between the second voltage and the first voltage corresponding to the second voltage is further provided, and the regulator outputs the first voltage corresponding to the second voltage based on the second correspondence table.

According to another preferred embodiment of the present invention, a voltage conversion circuit includes a power supply, a voltage conversion circuit unit connected to the power supply, and multilayer capacitors connected to at least one of an input side and an output side of the voltage conversion circuit unit, wherein the voltage smoothing circuit according to one of various preferred embodiments of the present invention includes the multilayer capacitors as the first and second multilayer capacitors.

According to still another preferred embodiment of the present invention, a method for controlling a voltage to be applied to a multilayer capacitor includes the steps of: detecting a second voltage which is applied to the second multilayer capacitor; calculating a first voltage based on the detected second voltage such that a potential difference which is applied to the first multilayer capacitor decreases when a potential difference which is applied to the second multilayer capacitor increases and the potential difference which is applied to the first multilayer capacitor increases when the potential difference which is applied to the second multilayer capacitor decreases; and applying the calculated first voltage to the first multilayer capacitor.

The voltage smoothing circuit, the voltage conversion circuit, and the method for controlling the voltage to be applied to the multilayer capacitor according to various preferred embodiments of the present invention significantly reduce or prevent acoustic noise that is generated from a circuit board.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the drawings.

Figures 1A, 1B:
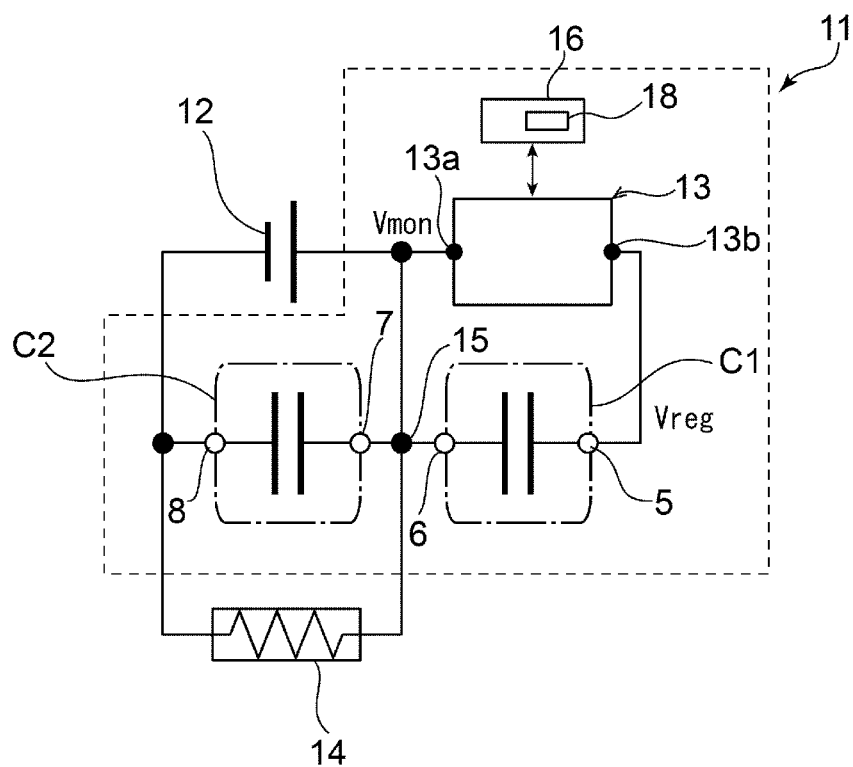
FIG. 1A is a circuit diagram illustrating a voltage smoothing circuit according to a first preferred embodiment of the present invention.
FIG. 1B is a view illustrating a second correspondence table.

FIG. 1A is a circuit diagram illustrating a voltage smoothing circuit according to a first preferred embodiment of the present invention.

A voltage smoothing circuit 11 in the present preferred embodiment is connected to a direct current (DC) power supply 12. To be more specific, a portion enclosed by a dashed line in FIG. 1A corresponds to the voltage smoothing circuit 11 in the present preferred embodiment. The voltage smoothing circuit 11 is connected to the DC power supply 12. The voltage smoothing circuit 11 includes a first multilayer capacitor C1, a second multilayer capacitor C2, and a regulator 13. The regulator 13 includes an input terminal 13a and an output terminal 13b.

Figure 2:
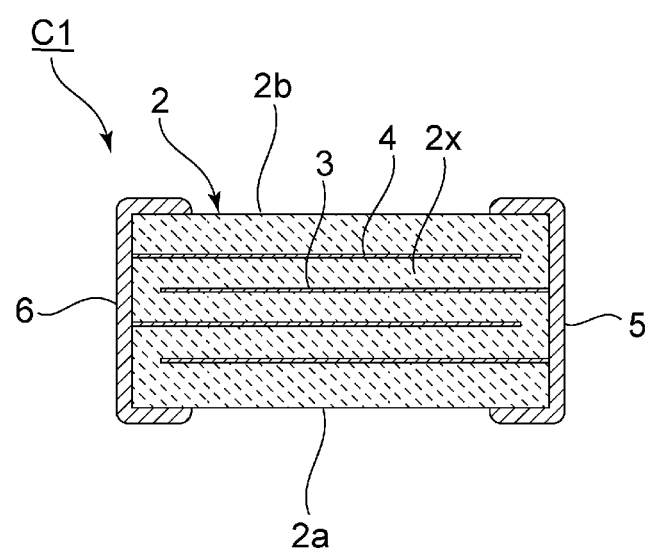
FIG. 2 is a front cross-sectional view illustrating a first multilayer capacitor included in the voltage smoothing circuit in the first preferred embodiment of the invention.

The configurations of the first and second multilayer capacitors C1 and C2 are not particularly limited. FIG. 2 illustrates the first multilayer capacitor C1 with a front cross-sectional view. The first multilayer capacitor C1 includes a multilayer body 2. Dielectric layers 2X, first inner electrodes 3, and second inner electrodes 4 are stacked in the multilayer body 2. The multilayer body 2 includes a first principal surface 2a defining and serving as a mounting surface that is mounted on a circuit board or the like and a second principal surface 2b opposing the first principal surface 2a. The first inner electrodes 3 are electrically connected to a first outer electrode 5 and the second inner electrodes 4 are electrically connected to a second outer electrode 6.

The dielectric layers 2x are formed of appropriate dielectric ceramics. Smoothing of a voltage requires high capacitance, and the dielectric ceramics is preferably ceramics having a high relative dielectric constant. As will be described later, use of the ceramics having a high relative dielectric constant causes the above-mentioned "acoustic noise" to be generated easily. Therefore, various preferred embodiments of the present invention are more effective.

The second multilayer capacitor C2 also is capable of being defined by an appropriate multilayer capacitor as in the first multilayer capacitor C1.

With reference back to FIG. 1A, the first multilayer capacitor C1 and the second multilayer capacitor C2 are connected in series. The regulator 13 is connected between the first outer electrode 5 of the first multilayer capacitor C1 and the DC power supply 12. An input voltage is applied to the input terminal 13a of the regulator 13 from the DC power supply 12. As will be described later, an average value of the input voltages in a predetermined period of time is set as a second voltage Vmon in the present preferred embodiment. The regulator 13 is a voltage conversion circuit, which converts the second voltage Vmon and outputs a first voltage Vreg from the output terminal 13b.

The first multilayer capacitor C1 and the second multilayer capacitor C2 are connected in series. The above-mentioned second voltage Vmon is applied to a node 15 between the first multilayer capacitor C1 and the second multilayer capacitor C2. In the present preferred embodiment, Vmon is lower than Vreg. Accordingly, an end portion of the first multilayer capacitor C1 at the node 15 side corresponds to an end portion at the low-voltage side and an end portion of the first multilayer capacitor C1 at the first outer electrode 5 side corresponds to an end portion at the high-voltage side. An end portion of the second multilayer capacitor C2 at the node 15 side corresponds to an end portion at the high-voltage side and an end portion of the second multilayer capacitor C2 at a second outer electrode 8 side corresponds to an end portion at the low-voltage side.

Therefore, in the present preferred embodiment, the end portion of the first multilayer capacitor C1 at the low-voltage side and the end portion of the second multilayer capacitor C2 at the high-voltage side are connected. A load 14 is connected between the node 15 and the second outer electrode 8 of the second multilayer capacitor C2. That is to say, an output of the above-mentioned voltage smoothing circuit 11 is applied to the load 14. The output voltage applied to the load 14 is smoothed by the second multilayer capacitor C2.

It should be noted that although Vmon is lower than Vreg in the present preferred embodiment, Vmon may be higher than Vreg. Further, the end portion of the second multilayer capacitor C2 at the high-voltage side may be connected to the end portion of the first multilayer capacitor C1 at the high-voltage side.

As described in Japanese Unexamined Patent Application Publication No. 2013-258278, even when the first multilayer capacitor and the second multilayer capacitor are driven in the opposite phases, expansion and contraction on the first multilayer capacitor and the second multilayer capacitor cannot be completely cancelled by each other. Due to this, distortions on the multilayer capacitors remain and it is difficult to reduce or prevent vibration of a circuit board. This is because a voltage distortion curve indicating a relationship between a potential difference which is applied and the distortion is non-linear for each of the first multilayer capacitor and the second multilayer capacitor.

In contrast, in the present preferred embodiment, even when the voltage distortion curve is non-linear, vibration of the circuit board is effectively reduced or prevented as will be described below.

As described above, in the present preferred embodiment, the average value of the voltages that are input in the predetermined period of time is calculated to be set as the second voltage Vmon.

A potential difference $\Delta V2$ which is applied to the second multilayer capacitor C2 is the second voltage Vmon. Meanwhile, a potential difference $\Delta V1$ which is applied to the first multilayer capacitor C1 is obtained by subtracting the second voltage Vmon from the first voltage Vreg.

The regulator 13 calculates the first voltage Vreg which is output based on the given second voltage Vmon such that when the potential difference $\Delta V2$ increases, $\Delta V1$ decreases and when $\Delta V2$ decreases, $\Delta V1$ increase, and outputs the first voltage Vreg.

FIG. 1B illustrates a second correspondence table 18. The second correspondence table 18 contains a correspondence relationship between the second voltage Vmon and the first voltage Vreg corresponding to the second voltage Vmon. The second correspondence table 18 is stored in advance in a memory 16. That is to say, the correspondence relationship between the second voltage and the first voltage in which when $\Delta V2$ increases, $\Delta V1$ decreases and when $\Delta V2$ decreases, $\Delta V1$ increases is stored in advance. The regulator 13 calculates the first voltage Vreg corresponding to the second voltage Vmon using the second correspondence table 18 and outputs the first voltage Vreg.

That vibration of the circuit board caused by the distortion on the first multilayer capacitor C1 and vibration of the circuit board caused by the distortion on the second multilayer capacitor C2 are cancelled by each other will be described in further detail with reference to FIG. 3. A curve S1 is a voltage distortion curve indicating a relationship between a voltage which is applied to the first multilayer capacitor C1 and distortion thereon. A curve S2 is a voltage distortion curve indicating a relationship between a voltage which is applied to the second multilayer capacitor C2 and distortion thereon. The curve S1 and the curve S2 are similar curves but the curve S1 is illustrated in a right and left inverted mode with respect to the curve S2 while the first voltage Vreg is set as a reference for the convenience of explanation because the voltage which is applied to the first multilayer capacitor C1 is the potential difference between the first voltage Vreg (constant) and the second voltage Vmon (variable). Both of the voltage distortion curve S1 and the voltage distortion curve S2 are non-linear. Accordingly, even when the first multilayer capacitor C1 and the second multilayer capacitor C2 are driven simply in the opposite phases, it is difficult to eliminate the vibration of the circuit board because amplitudes of the vibrations of the circuit board caused by the respective distortions are different.

Figure 3:
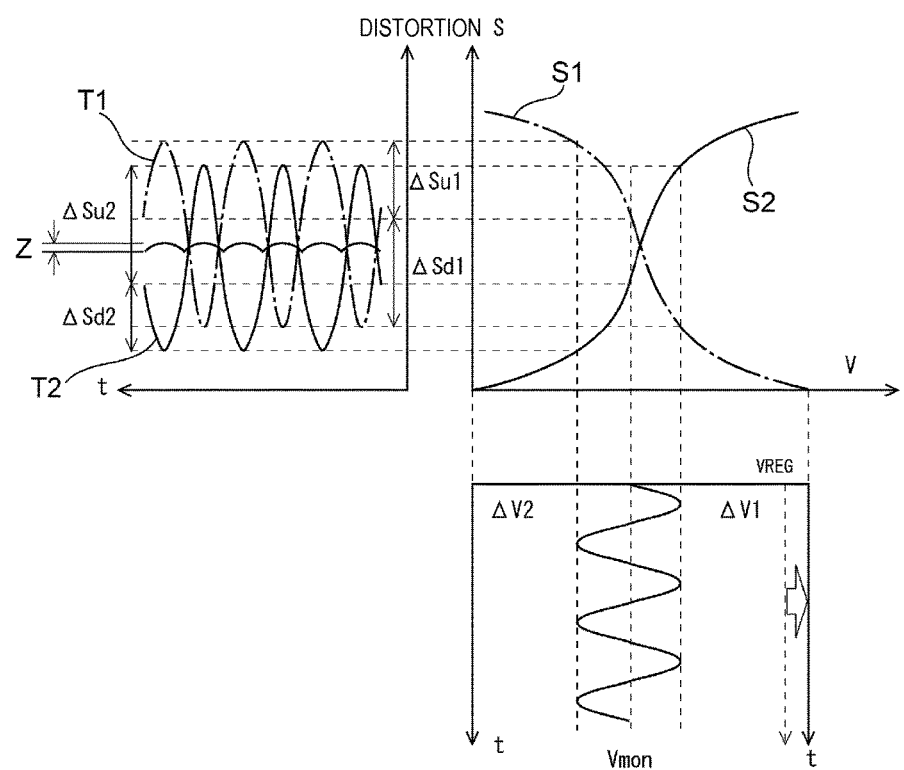
FIG. 3 is a view for explaining a relationship between potential differences which are applied to the first multilayer capacitor and a second multilayer capacitor and distortions thereon in the voltage smoothing circuit in the first preferred embodiment of the present invention.

A graph at the left side of the voltage distortion curves S1 and S2 in FIG. 3 indicates a time change in the distortion on each of the first multilayer capacitor C1 and the second multilayer capacitor C2. A curve T1 and a curve T2 indicate time changes in the distortion on the first multilayer capacitor C1 and the distortion on the second multilayer capacitor C2, respectively. The second voltage Vmon changes with a variation in the load 14. Accordingly, positive distortion $\Delta Su1$ and negative distortion $\Delta Sd1$ are generated on the first multilayer capacitor C1 due to the change in the second voltage Vmon. Positive distortion $\Delta Su2$ and negative distortion $\Delta Sd2$ are generated on the second multilayer capacitor C2.

It should be noted that the positive distortion indicates distortion in the direction in which the distortion increases, for example, and the negative distortion indicates distortion in the direction in which the distortion decreases.

The first multilayer capacitor C1 and the second multilayer capacitor C2 are driven in the opposite phases but the voltage distortion curves S1 and S2 are non-linear as described above. Therefore, the magnitude of the positive distortion $\Delta Su1$ and the magnitude of the negative distortion $\Delta Sd1$ on the first multilayer capacitor C1 are different. In the same manner, the magnitude of the positive distortion $\Delta Su2$ and the magnitude of the negative distortion $\Delta Sd2$ on the second multilayer capacitor C2 are also different. Accordingly, the distortion on the first multilayer capacitor C1 and the distortion on the second multilayer capacitor C2 are not completely cancelled by each other.

However, in the present preferred embodiment, when the potential difference $\Delta V2$ has decreased or increased, the potential difference $\Delta V1$ increases or decreases while offsetting the first voltage Vreg, thus significantly reducing a residual component Z defining or serving as a difference therebetween. This further reduces or prevents the vibration of the circuit board and significantly reduces or prevents acoustic noise.

Figure 4:
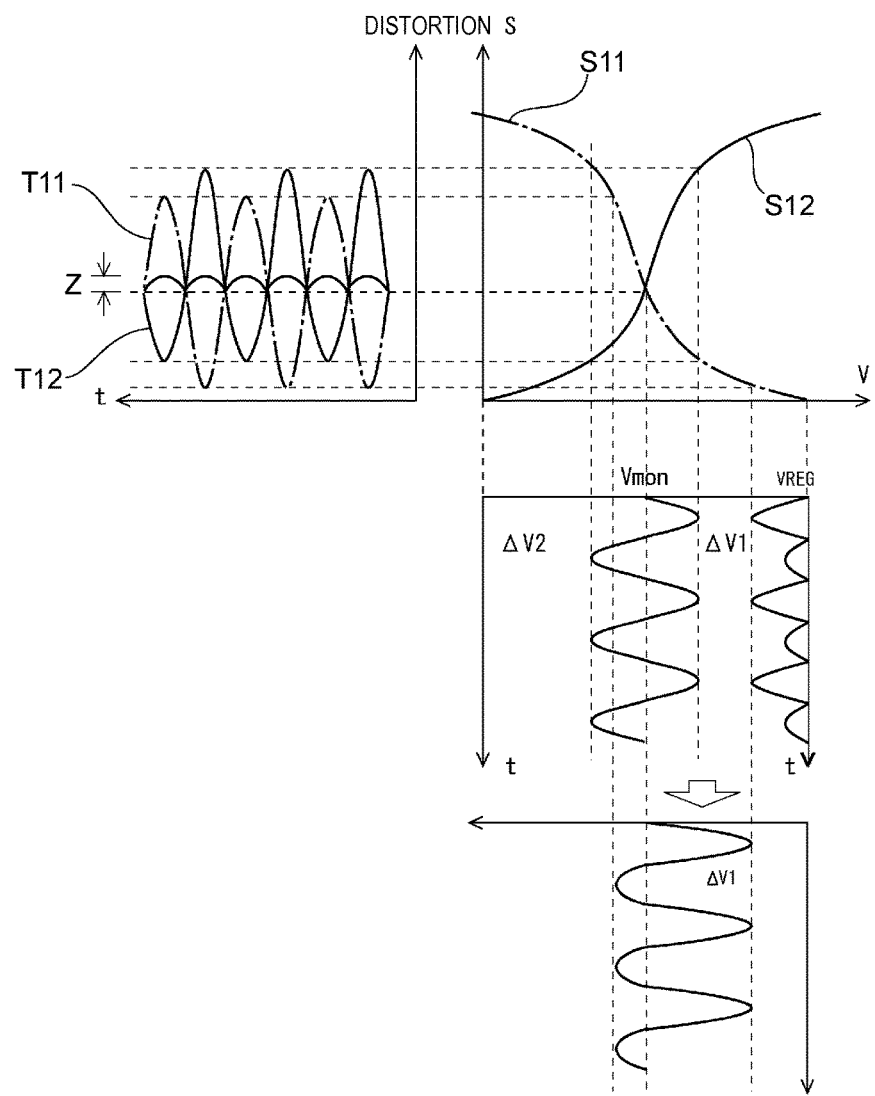
FIG. 4 is a view for explaining a relationship between potential differences which are applied to a first multilayer capacitor and a second multilayer capacitor and distortions thereon in a voltage smoothing circuit according to a second preferred embodiment of the present invention.

FIG. 4 is a view for explaining a voltage control method of a multilayer capacitor by a regulator in a voltage smoothing circuit according to a second preferred embodiment of the present invention. The second preferred embodiment is different from the first preferred embodiment in how the second voltage Vmon is calculated. Accordingly, the voltage smoothing circuit in the second preferred embodiment is the same as the voltage smoothing circuit 11 described in the first preferred embodiment.

In the second preferred embodiment, an input voltage that is actually applied to the regulator 13 is set as the second voltage Vmon. That is to say, the average value in the predetermined period of time is not used but a voltage that is actually applied to the input terminal 13a is set as the second voltage Vmon.

In the second preferred embodiment as well, the regulator 13 is connected to the memory 16 storing the second correspondence table 18. The first voltage Vreg corresponding to the given second voltage Vmon is output from the output terminal 13b.

As illustrated in FIG. 4, in the second preferred embodiment as well, voltage distortion curves S11 and S12 are non-linear. It should be noted that the voltage distortion curves S11 and S12 are voltage distortion curves of the first multilayer capacitor C1 and the second multilayer capacitor C2, respectively.

In FIG. 4, curves T11 and T12 indicating time changes in the distortions on the first multilayer capacitor C1 and the second multilayer capacitor C2, respectively, are illustrated at the left side of the voltage distortion curves S11 and S12. The voltage distortion curves S11 and S12 are non-linear, so that the distortion cannot be eliminated by cancellation of the distortions on the first multilayer capacitor C1 and the second multilayer capacitor C2 by each other. That is to say, the residual component Z is generated.

In the present preferred embodiment, the regulator 13 outputs, from the output terminal 13b, the first voltage Vreg corresponding to the second voltage Vmon applied to the input terminal 13a in accordance with the second voltage Vmon stored in the second correspondence table 18. The correspondence relationship stored in the second correspondence table 18 is defined such that when the potential difference ΔV2 which is applied to the second multilayer capacitor C2 increases, the potential difference ΔV1 which is applied to the first multilayer capacitor C1 decreases and when the potential difference ΔV2 decreases, the potential difference ΔV1 increases, as described above.

Accordingly, the potential difference ΔV2 and the potential difference ΔV1 change with a change in time t as illustrated at the lower side of the voltage distortion curves S11 and S12 in FIG. 4. The change in the potential difference ΔV1 over time is illustrated on a lowermost portion in FIG. 4.

As in the second preferred embodiment, the first voltage Vreg as a control voltage may be output while being controlled in real time in accordance with the second voltage Vmon that is actually input. With this, the voltage that is applied to the first multilayer capacitor C1 is controlled more finely than in the first preferred embodiment so as to further reduce the vibration of the circuit board and significantly reduce or prevent acoustic noise.

Figures 5A, 5B:
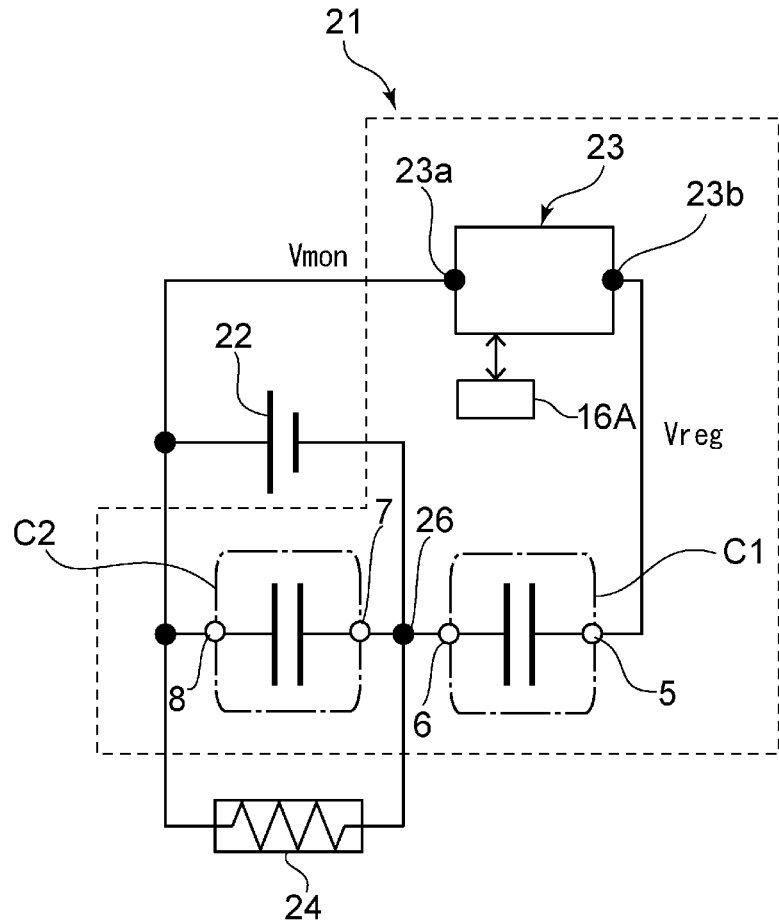
FIG. 5A is a circuit diagram illustrating a voltage smoothing circuit according to a third preferred embodiment of the present invention.
FIG. 5B is a view illustrating a first correspondence table.
Figure 6:
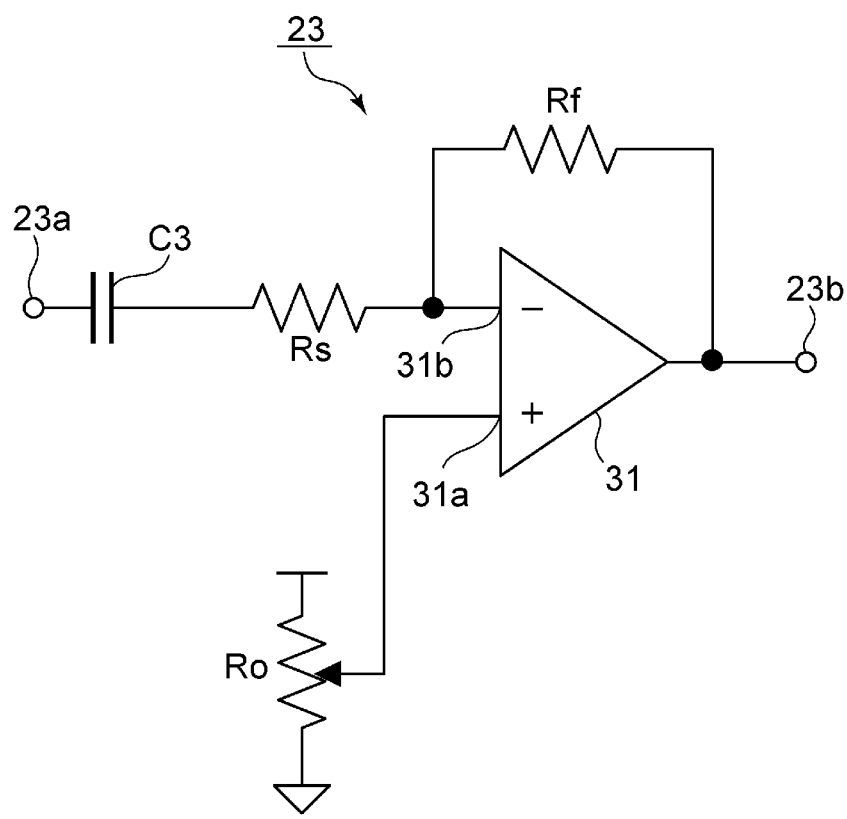
FIG. 6 is a circuit diagram for explaining a regulator included in the third preferred embodiment of the present invention.

FIG. 5A is a circuit diagram illustrating a voltage smoothing circuit according to a third preferred embodiment of the invention, and FIG. 6 is a circuit diagram illustrating a regulator that is used in the third preferred embodiment of the present invention.

A voltage smoothing circuit 21 illustrated in FIG. 5A includes the first multilayer capacitor C1 and the second multilayer capacitor C2. Further, the voltage smoothing circuit 21 includes a regulator 23. The voltage smoothing circuit 21 is connected to a DC power supply 22 and outputs a current at a predetermined voltage to a load 24. The DC power supply 22 outputs the second voltage Vmon. The second voltage Vmon is applied to an input terminal 23a of the regulator 23. The regulator 23 outputs the first voltage Vreg corresponding to the second voltage Vmon from an output terminal 23b.

In the present preferred embodiment, the second outer electrode 8 of the second multilayer capacitor C2 is electrically connected to an outside terminal of the DC power supply 22. A ground-side terminal of the DC power supply 22 is connected to a node 26. A first outer electrode 7 of the second multilayer capacitor C2 and the second outer electrode 6 of the first multilayer capacitor C1 are electrically connected to the node 26. The first outer electrode 5 of the first multilayer capacitor C1 is connected to the output terminal 23b of the regulator 23. An end portion of the DC power supply 22 at the high-voltage side is connected to the input terminal 23a of the regulator 23. The load 24 is connected in parallel to the second multilayer capacitor C2. Accordingly, the second outer electrode 6 of the first multilayer capacitor C1 and the first outer electrode 7 of the second multilayer capacitor C2 are end portions at the low-voltage side.

Therefore, in the present preferred embodiment, an end portion of the first multilayer capacitor C1 at the first outer electrode 5 side corresponds to an end portion at the high-voltage side and an end portion of the first multilayer capacitor C1 at the node 26 side corresponds to an end portion at the low-voltage side. An end portion of the second multilayer capacitor C2 at the second outer electrode 8 side corresponds to an end portion at the high-voltage side and an end portion of second multilayer capacitor C2 at the node 26 side corresponds to an end portion at the low-voltage side. That is to say, the end portion of the first multilayer capacitor C1 at the low-voltage side and the end portion of the second multilayer capacitor C2 at the low-voltage side are electrically connected.

In the present preferred embodiment, the first multilayer capacitor C1 and the second multilayer capacitor C2 are connected as described above, and the load 24 is connected between the node 26 and the second voltage Vmon.

The regulator 23 includes a circuit configuration as illustrated in FIG. 6. That is to say, the regulator 23 includes the input terminal 23a and the output terminal 23b. An operational amplifier 31 is connected between the input terminal 23a and the output terminal 23b. The operational amplifier 31 includes a first input terminal 31a and a second input terminal 31b. A capacitor C3 and a resistor Rs are connected in series between the first input terminal 31a and the input terminal 23a. A resistor Rf is connected between the first input terminal 31a and the output terminal 23b.

The operational amplifier 31, the resistor Rs, and the resistor Rf define an inverting amplifier.

The first input terminal 31a is connected to a variable resistor Ro. One end of the variable resistor Ro is connected to the ground potential and the other end thereof is connected to the power supply voltage.

In the present preferred embodiment, the above-described inverting amplification circuit is included, so that the first voltage Vreg with a phase inverted with respect to that of the second voltage Vmon is applied to the first multilayer capacitor C1. Accordingly, the distortion on the first multilayer capacitor C1 and the distortion on the second multilayer capacitor C2 are cancelled by each other. In the present preferred embodiment, the input second voltage Vmon is converted into the first voltage Vreg by adjusting a value of the variable resistor Ro and the first voltage Vreg is output from the output terminal 23b.

The value of the first voltage Vreg can be calculated in the same manner as in the first and second preferred embodiments. That is to say, the first voltage Vreg may be calculated using the second correspondence table containing the correspondence relationship between the second voltage Vmon and the first voltage Vreg that has been defined in advance in accordance with the second voltage Vmon. With this, in the present preferred embodiment as well, the residual component of the distortion is reduced by controlling such that when the potential difference ΔV2 which is applied to the second multilayer capacitor increases, the potential difference ΔV1 which is applied to the first multilayer capacitor C1 decreases and when the potential difference ΔV2 decreases, the potential difference ΔV1 increases.

In the present preferred embodiment, the first voltage Vreg is controlled by changing the resistance value of the variable resistor Ro. However, the magnitude of the first voltage Vreg also is able to be adjusted by adjusting an amplification factor of the operational amplifier, that is, a ratio between the resistor Rf and the resistor Rs.

Accordingly, a first correspondence table 18A illustrated in FIG. 5B may be stored in a first memory 16A.

The first correspondence table 18A describes correspondence between the value of the variable resistor Ro as an offset resistor or the amplification factor and the second voltage Vmon.

It should be noted that adjustment of both of the variable resistor Ro and the operational amplification factor may be performed.

The first multilayer capacitor C1 and the second multilayer capacitor C2 of the voltage smoothing circuit according to one of various preferred embodiments of the present invention are arranged on the circuit board so as to be adjacent to each other, thus effectively reducing or preventing vibration of the circuit board. Preferably, the first multilayer capacitor C1 and the second multilayer capacitor C2 oppose each other with no electronic component interposed therebetween and a distance between the opposing capacitors preferably is equal to or smaller than about 5 mm, for example.

Further, the voltage smoothing circuits according to various preferred embodiments of the present invention are capable of being used in various power supply portions. In particular, the voltage smoothing circuits according to various preferred embodiments of the present invention are preferably used in the following voltage conversion circuits such as a DC-to-DC conversion circuit, a charge pump, and an AC-to-DC converter.

Figure 7:
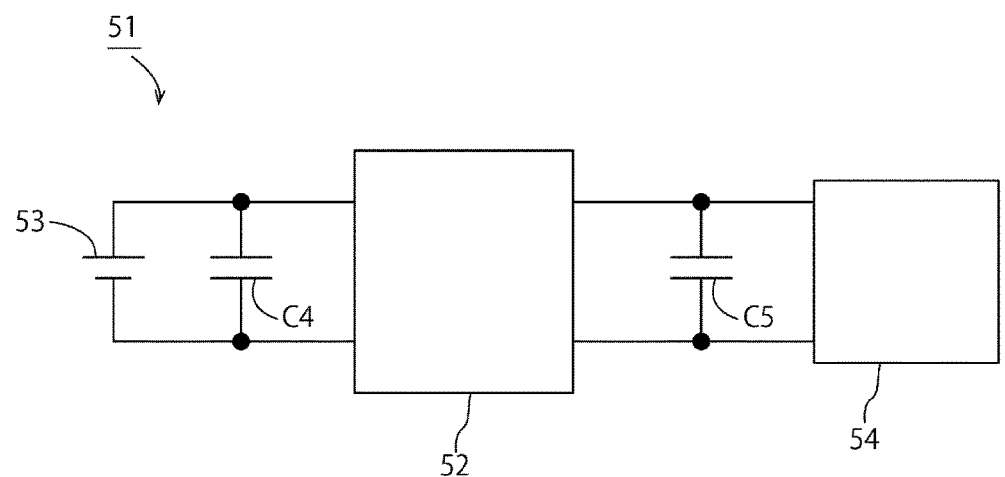
FIG. 7 is a circuit diagram for explaining a DC-to-DC conversion circuit to which the voltage smoothing circuit according to various preferred embodiments of the present invention is applied.

A DC-to-DC conversion circuit 51 illustrated in FIG. 7 includes a DC-to-DC conversion circuit unit 52. The DC-to-DC conversion circuit unit 52 is connected to a power supply 53. A capacitor C4 is connected between the power supply 53 and the DC-to-DC conversion circuit unit 52. A capacitor C5 is connected between the DC-to-DC conversion circuit unit 52 and a load circuit 54. The above-described voltage smoothing circuit preferably may include the plurality of capacitor C4 and the capacitor C5 as the first multilayer capacitor and the second multilayer capacitor. To be more specific, the capacitor C4 preferably may be used as the first multilayer capacitor and the capacitor C5 preferably may be used as the second multilayer capacitor. Alternatively, the capacitor C4 preferably may be divided into two multilayer capacitors and the two multilayer capacitors may be used as the first multilayer capacitor and the second multilayer capacitor. Moreover, the capacitor C5 preferably may be divided into two multilayer capacitors and the two multilayer capacitors preferably may be used as the first multilayer capacitor and the second multilayer capacitor. In any of these examples, acoustic noise that is generated from the DC-to-DC conversion circuit 51 is significantly reduced or prevented.

Figure 8:
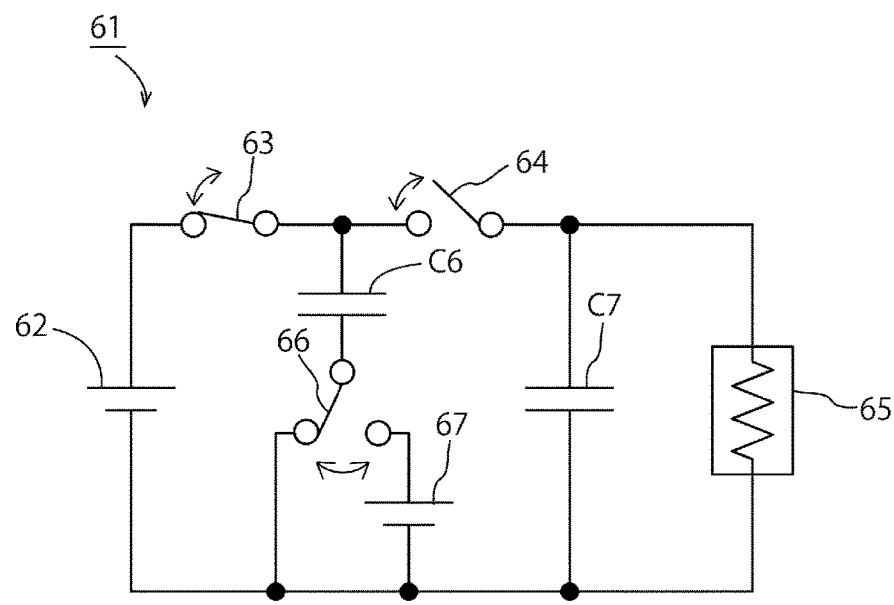
FIG. 8 is a circuit diagram illustrating an example of a charge pump to which the voltage smoothing circuit according to various preferred embodiments of the present invention is applied.

In a charge pump circuit 61 illustrated in FIG. 8, a load 65 is connected to a power supply 62 through switches 63 and 64. A capacitor C7 is connected in parallel with the load 65.

One end of a capacitor C6 is connected to a node between the switch 63 and the switch 64. The other end of the capacitor C6 is connected to a switch 66. One of first and second end portions of the switch 66 at the side opposite to the side at which the capacitor C6 is connected is connected to a power supply 67. The above-described voltage smoothing circuit according to various preferred embodiments of the present invention preferably is provided including the plurality of capacitor C6 and the capacitor C7 in the charge pump circuit 61 as the first multilayer capacitor and the second multilayer capacitor. To be more specific, the capacitor C6 preferably may be used as the first multilayer capacitor and the capacitor C7 preferably may be used as the second multilayer capacitor. Alternatively, the capacitor C6 preferably may be divided into two multilayer capacitors and the two multilayer capacitors preferably may be used as the first multilayer capacitor and the second multilayer capacitor. Moreover, the capacitor C7 preferably may be divided into two multilayer capacitors and the two multilayer capacitors preferably may be used as the first multilayer capacitor and the second multilayer capacitor. In any of the cases, vibration is significantly reduced and acoustic noise is significantly reduced or prevented.

Figure 9:
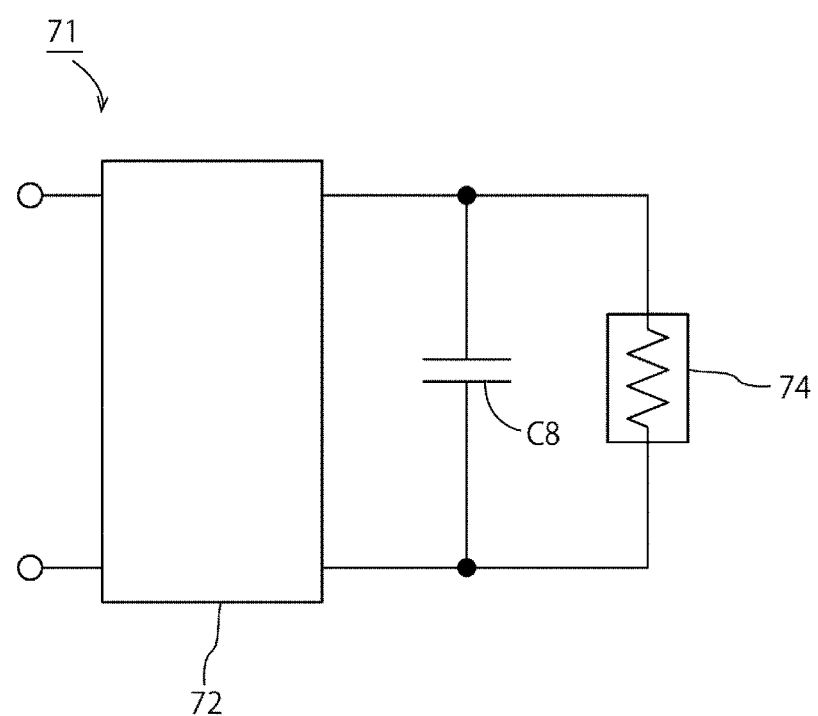
FIG. 9 is a circuit diagram illustrating an example of an AC-to-DC converter to which the voltage smoothing circuit according to various preferred embodiments of the present invention is applied.

An AC-to-DC converter 71 illustrated in FIG. 9 includes an AC-to-DC conversion circuit unit 72. A load 74 is connected to the AC-to-DC conversion circuit unit 72. A plurality of capacitors C8 are connected in parallel to the load 74. The capacitor C8 preferably may be divided into two multilayer capacitors and the voltage smoothing circuit of various preferred embodiments of the present invention preferably may be provided using the two multilayer capacitors as the first multilayer capacitor and the second multilayer capacitor. In this case, the voltage smoothing circuit is preferably provided between the AC-to-DC conversion circuit unit 72 and the load 74, thus applying a smooth voltage to the load.

As described above, in various circuits including a plurality of capacitors, the voltage smoothing circuit of various preferred embodiments of the present invention preferably is provided using at least two capacitors of the plurality of capacitors as the first multilayer capacitor and the second multilayer capacitor.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A voltage smoothing circuit for smoothing a voltage, the circuit comprising:
   a first multilayer capacitor and a second multilayer capacitor connected to the first multilayer capacitor; and
   a regulator which includes an input terminal and an output terminal, the input terminal being electrically connected to the second multilayer capacitor, the output terminal being electrically connected to the first multilayer capacitor; wherein
   the regulator calculates a first voltage which is applied to the first multilayer capacitor based on a second voltage which is applied to the input terminal, and outputs the first voltage from the output terminal such that a potential difference which is applied to the first multilayer capacitor decreases when a potential difference which is applied to the second multilayer capacitor increases, and the potential difference which is applied to the first multilayer capacitor increases when the potential difference which is applied to the second multilayer capacitor decreases.

2. The voltage smoothing circuit according to claim 1, wherein each of the first multilayer capacitor and the second multilayer capacitor includes an end portion at a high-voltage side and an end portion at a low-voltage side, the end portion of the second multilayer capacitor at the high-voltage side is electrically connected to the first multilayer capacitor, and the first voltage is higher than the second voltage.

3. The voltage smoothing circuit according to claim 1, wherein the regulator calculates the first voltage and an average value of voltages that are input in a predetermined period of time is set as the second voltage.

4. The voltage smoothing circuit according to claim 1, wherein the regulator calculates the first voltage and a voltage that has been actually input is set as the second voltage.

5. The voltage smoothing circuit according to claim 1, wherein each of the first multilayer capacitor and the second multilayer capacitor includes an end portion at a high-voltage side and an end portion at a low-voltage side, and the end portion of the first multilayer capacitor at the low-voltage side is electrically connected to the end portion of the second multilayer capacitor at the low-voltage side.

6. The voltage smoothing circuit according to claim 5, wherein the regulator includes an inverting amplification circuit, and the inverting amplification circuit outputs an output voltage with a phase inverted with respect to a phase of an input voltage.

7. The voltage smoothing circuit according to claim 6, further comprising:
a first memory storing a first correspondence table containing a correspondence relationship between the input voltage of the inverting amplification circuit defining the second voltage and an amplification factor or an offset resistance value; wherein
the regulator controls a magnitude of the first voltage based on the first correspondence table.

8. The voltage smoothing circuit according to claim 1, further comprising:
a second memory storing a second correspondence table containing a correspondence relationship between the second voltage and the first voltage corresponding to the second voltage; wherein
the regulator outputs the first voltage corresponding to a value of the second voltage based on the second correspondence table.

9. The voltage smoothing circuit according to claim 1, wherein
at least one of the first and second multilayer capacitors includes:
a multilayer body including a stack of a plurality of dielectric layers;
a first inner electrode and a second inner electrode arranged in the multilayer body; and
a first outer electrode and a second outer electrode provided on outer surfaces of the multilayer body; wherein
the first outer electrode and the second outer electrode are electrically connected to the first inner electrode and the second inner electrode, respectively.

10. The voltage smoothing circuit according to claim 1, wherein the first and second multilayer capacitors are connected in series.

11. The voltage smoothing circuit according to claim 1, wherein the regulator includes an operational amplifier connected between the input terminal and the output terminal.

12. The voltage smoothing circuit according to claim 11, wherein the regulator includes a capacitor and a resistor connected between a first input terminal and a second input terminal of the operational amplifier.

13. The voltage smoothing circuit according to claim 12, further comprising another resistor, wherein the operational amplifier, the resistor and the another resistor are connected to define an inverting amplifier.

14. The voltage smoothing circuit according to claim 12, further comprising a variable resistor connected to the first input terminal of the operational amplifier.

15. The voltage smoothing circuit according to claim 1, wherein the first multilayer capacitor and the second multilayer capacitor are mounted next to each other on a circuit board.

16. A voltage conversion circuit comprising:
a power supply;
a voltage conversion circuit unit connected to the power supply; and
multilayer capacitors connected to at least one of an input side and an output side of the voltage conversion circuit unit; wherein
the multilayer capacitors are defined by the first and second multilayer capacitors of the voltage smoothing circuit according to claim 1.

17. The voltage conversion circuit according to claim 16, wherein the voltage conversion circuit is one of a DC-to-DC conversion circuit, a charge pump, and an AC-to-DC converter.

18. A method for controlling a voltage to be applied to a first multilayer capacitor in a voltage smoothing circuit including the first multilayer capacitor and a second multilayer capacitor, the method comprising steps of:
detecting a second voltage which is applied to the second multilayer capacitor;
calculating a first voltage based on the detected second voltage such that a potential difference which is applied to the first multilayer capacitor decreases when a potential difference which is applied to the second multilayer capacitor increases, and the potential difference which is applied to the first multilayer capacitor increases when the potential difference which is applied to the second multilayer capacitor decreases; and
applying the first voltage calculated to the first multilayer capacitor.

* * * * *